US012563077B2

(12) United States Patent
Hathaway et al.

(10) Patent No.: US 12,563,077 B2
(45) Date of Patent: Feb. 24, 2026

(54) COMPUTERIZED SYSTEM FOR ANALYSIS AND OF ELECTRONIC COMMUNICATION SYSTEMS

(71) Applicant: Virtual Connect Technologies, Inc., Greenville, SC (US)

(72) Inventors: Benjamin Hathaway, Greenville, SC (US); David Setzer, Greenville, SC (US)

(73) Assignee: Virtual Connect Technologies, Inc., Greenville, SC (US)

( * ) Notice: Subject to any disclaimer, the term of this patent is extended or adjusted under 35 U.S.C. 154(b) by 436 days.

(21) Appl. No.: 17/883,941

(22) Filed: Aug. 9, 2022

(65) Prior Publication Data

US 2024/0056466 A1     Feb. 15, 2024

(51) Int. Cl.
*H04L 29/06*        (2006.01)
*H04L 9/40*         (2022.01)
*H04L 51/212*       (2022.01)

(52) U.S. Cl.
CPC ........ *H04L 63/1433* (2013.01); *H04L 51/212* (2022.05)

(58) Field of Classification Search
CPC .......................... H04L 51/212; H04L 63/1433
See application file for complete search history.

(56) References Cited

U.S. PATENT DOCUMENTS

| | | | |
|---|---|---|---|
| 7,174,368 | B2 | 2/2007 | Ross, Jr. |
| 7,302,487 | B2 | 11/2007 | Ylonen et al. |

| | | | |
|---|---|---|---|
| 7,571,214 | B2 | 8/2009 | Schiavone |
| 7,634,810 | B2 | 12/2009 | Goodman et al. |
| 7,865,458 | B2 | 1/2011 | Callanan et al. |
| 8,099,598 | B1 | 1/2012 | Liu |
| 8,152,022 | B2 | 4/2012 | Nygaard-Petersen |
| 8,341,249 | B2 | 12/2012 | Rakowski et al. |
| 8,707,442 | B1 | 4/2014 | Lax et al. |
| 9,344,394 | B2 | 5/2016 | Hardy |
| 9,501,746 | B2 | 11/2016 | Prakash |
| 9,686,308 | B1 | 6/2017 | Srivastava |
| 9,916,481 | B2 | 3/2018 | Fitzgerald |
| 10,181,957 | B2 | 1/2019 | Srivastava |
| 10,255,602 | B2 | 4/2019 | Wang |

(Continued)

*Primary Examiner* — Tri M Tran
(74) *Attorney, Agent, or Firm* — Kim and Lahey Law Firm, LLC; Douglas W. Kim

(57)                ABSTRACT

A computerized system for analysis of electronic communication systems comprising: a set of testing computer readable instructions adapted for: receiving an email address representing a target message system to be tested, generating a test email wherein the test message requests a reply message, receiving a reply from the target message system, analyzing the test message and the reply message according to a security test taken from the group consisting of: a TLS encryption analysis, a MX record exposure, a DKIM presence, a SPF presence, a DMARC presence, a reputational information, a reverse DNS lookup consistency and any combination thereof to provide score deduction factors, generating an aggregate deduction value according to the set of security score deduction factors, generating a security score, displaying the security score, and, displaying recommendations for target message system modifications according to the security score deduction factor.

16 Claims, 9 Drawing Sheets

(56) References Cited

U.S. PATENT DOCUMENTS

| | | | |
|---|---|---|---|
| 10,291,589 B1 | 5/2019 | Sharifi Mehr | |
| 10,404,745 B2 | 9/2019 | Verma et al. | |
| 10,628,797 B2 | 4/2020 | Shraim | |
| 10,708,244 B2 | 7/2020 | Hathaway et al. | |
| 10,992,699 B1 * | 4/2021 | Sites | G06N 20/20 |
| 11,019,000 B2 | 5/2021 | Klemm | |
| 11,184,337 B2 | 11/2021 | Hathaway et al. | |
| 11,456,998 B2 | 9/2022 | Hathaway et al. | |
| 11,757,914 B1 * | 9/2023 | Jakobsson | H04L 51/42 |
| | | | 726/25 |
| 12,074,850 B2 * | 8/2024 | Jakobsson | H04L 63/1433 |
| 2002/0016913 A1 | 2/2002 | Wheeler et al. | |
| 2003/0229672 A1 | 12/2003 | Kohn | |
| 2006/0021066 A1 | 1/2006 | Clayton et al. | |
| 2008/0313704 A1 | 12/2008 | Sivaprasad | |
| 2013/0276017 A1 | 10/2013 | Walker et al. | |
| 2014/0068273 A1 | 3/2014 | Sobel et al. | |
| 2015/0012339 A1 | 1/2015 | Onischuk | |
| 2015/0220718 A1 | 8/2015 | Hong et al. | |
| 2017/0220612 A1 | 8/2017 | Crossley et al. | |
| 2017/0338967 A1 | 11/2017 | Lewison et al. | |
| 2018/0167221 A1 | 6/2018 | Kalan et al. | |
| 2019/0260780 A1 | 8/2019 | Dunn | |
| 2022/0045995 A1 | 2/2022 | Hathaway et al. | |
| 2023/0412548 A1 * | 12/2023 | Leclair | H04L 51/234 |

* cited by examiner

COMPUTERIZED SYSTEM FOR ANALYSIS AND OF ELECTRONIC COMMUNICATION SYSTEMS

BACKGROUND OF THE INVENTION

1) Field of the Invention

This system is directed to a computerized system for the testing, analysis, recommendations for improving security of transmitted electronic information from a sender to a recipient including strengths and weaknesses in security associated with the transmission of such electronic messages.

2) Description of the Related Art

The use of electronic message, especially email, is prevalent in today's society. It is estimated that billions of emails are sent per day. Email is being used for several purposes including personal communications, business communications, marketing, advertising, multi-party communications, collaboration, transmitting attachments, document or any other information interactions, and many other uses. Because of its increased use as well as the increase in security risks with modern communications, a system that can assist with the identification of security risks, analysis of weaknesses and the ability to provide recommendations would be desirable.

Some of the undesirable uses of email addresses by those such as hackers can include phishing attempts, spam, attempted to obtain financial and personal information and other undesirable and even illegal activities. Generally, phishing refers to an attempt to gather private, confidential, or protected information by social engineering which seeks to have potential victims disclose sensitive information under false pretenses. Phishing attacks are usually carried out via communication channels such as email or instant messaging by fraudulent or misleading actors posing as legitimate and trustworthy entities so that the victim "trust" the bad actor and discloses such information. It is desirable to identify risks that can lead to successful phishing attempts and provide preventive measures so that these attempts can be reduced if not eliminated.

There have been attempts to automatically filter or identify undesirable electronic messages such as shown in U.S. Pat. No. 9,501,746 which discloses a system related to detecting bad actors impersonate other people's identity in order to increase the likelihood of recipients opening these bad actors' messages and attachments. This patent states that this undesirable activity is generally referred to as "phishing" and specifically "spear phishing" when the recipient is targeted by the fake sender who is referred to as a "phisher". This patent also states that these phishers send these "fake emails" seeking to increase their likelihood of successfully gaining unauthorized access to confidential data, trade secrets, state secrets, military information, and other information. The motivation of these phishers is typically for financial gain through fraud, identity theft and/or data theft as well as those which wish to disrupt normal operations. Phishing attempts have been associated with private entities as well as being state sponsored and even foreign government themselves.

Once attempt to detect and/or handle targeted attacks is show in U.S. Pat. Nos. 9,686,308 and 10,181,957 disclose a system for detecting and/or handling target attacks in an enterprise's email channel. This patent discloses receiving aspects of an incoming electronic message addressed to a first email account holder, selecting a recipient interaction profile and/or a sender profile from a plurality of predetermined profiles stored in a memory, determining a message trust rating associated with the incoming email message based upon the incoming email message and the selected recipient interaction profile and/or the sender profile; and generating an alert identifying the incoming email message as including a security risk based upon the determined message trust rating. However, these techniques are limited to the message being received by the electronic message system and limited to the relationship between the sender and the recipient. It would be advantageous to have a system that can reduce the risks of such attacks and other security risks so that the email owner's security protection can be increased.

Typically, attempt to reduce email risks include an "after the fact" designed to react to phishing attempts is shown in U.S. Pat. No. 7,634,810. This patent discloses a phishing detection module that detects a phishing attack in the communication by determining if the domain of the message source is similar to a known phishing domain, or by detecting suspicious network properties of the domain. This attempt requires that information about the message domain is known allowing bad actors to simply change domains to overcome this system.

Another attempt to detect, prevent and provide notification of phishing attempts is shown in U.S. Pat. No. 10,404,745 which discloses the use of natural language techniques and information present in an email (namely the header, links, and text in the body) to detect phishing. This system is limited to an analysis of the email itself and occurs once the phishing attempt or attack has been initiated. It would be advantageous to reduce the ability of a phishing attempt to occur in the first place, rather than an "after-the-fact" solution as in the prior art.

One risk with email is that it is a plain text communication which allows other to potentially see the contents. There are some preventative measures that can be taken to tighten security that include the use of transport layer security (TLS). TLS is a form of encryption that protects email while it's in transit. When using TLS, a sender's email service will request the receiving email service to start the secure connection. If a secure connection can be provided, the sending service will share the necessary list of protocols and ciphers needed to encrypt the message content. Then, the email sends securely to the recipient using a public key to encrypt and a private key to decrypt. While TLS is relatively easy to use, it does require administrative tasks and support which can be either not implemented, not properly implemented, or improperly modified when chances to an email server occur. Further, an up-to-date TLS certification is required and needs to be monitored. TLS, while recommended, only protects the email in transmit so that other protections are needed for a comprehensive surety system directed to email communications. Nevertheless, a system that allows for analysis and reporting of TLS properly being installed and used would be advantageous.

Another risk associated with email systems is the mail exchange (MX) record which, based upon its configuration, can expose the sender's origin IP address and therefore increase the risk of a denial-of-service attack. The MX record includes information for sending email services (e.g., servers), such as the name of the responsible server for accepting emails on behalf of the domain and establishes a link between the domain name and the inbound mail service. The MX record is used, generally, in the following process:

(A) an email is sent to a email address having a domain name. The sending mail service uses the domain name and inquires there the name services are located; (B) the domain replies with a MX record that informs the sender's mail service what servers are allowed to receive the email to that domain and (C) the sender receives the MX record and based upon the hosts or hosts in the MX record, request the service's IP address. In certain configurations the MX record can be configured to obscure the original IP reducing the security risks associated with the MX record information.

One standard that has developed for email security is the domain keys identified mail (DKIM) standard. This standard assists in the detection of alterations in an email while in transit between a sending service and a receiving service. Generally, DKIM uses a public key to sign email with a sender's private key as it leaves a sending service. The recipient service then uses a public key published to the DKIM's domain to verify the source of the message and that the contents of the message included in the DKIM signature haven't changed since the message was signed. If the email message signature is verified with the public key by the recipient service, the message is considered authentic. DKIM makes spoofing harder from the senders' email domain. Further, the DKIM standard is used by internet service provides (ISP) to build a reputation for a domain over time thereby improving email deliverability as more trust is built. It is also important to note that DKIM is not an encryption protocol and therefore is best used in combination with TLS or similar technologies.

Another mechanism that can be used for improved email protection is sender policy framework (SPF). SPF is a type of DNS TXT record that lists all the servers authorized to send emails from a particular domain. Generally, SPF works by sending an email from a first server with an IP address and a return path email address. The receiving server uses the return path email address and searches for the SPF record. A second server finds the SPF record for the return path email address (domain) and determines if the first server is an authorized sender. If the IP address listed in the SPF record than the email will be delivered. If the IP address is not in the SPF record, then the email can be rejected, marked as spam or otherwise disposed. SPF records are used to reduce the risks of risk for phishing attacks, spam emails, and email spoofing by making it harder to imitate a domain. SPF can be used with DMARC validation so that domain-based message authentication reporting and conformance (DMARC) policies can be used to determine what happens to a rejected email.

DMARC is a method of authenticating email messages and informs receiving email services what actions to take under a SPG and DKIM. DMARC reduces or prevents email spoofing. DMARC can reduce the risk of and prevent malicious parties, hackers, and spammers from sending emails from a domain that they are not authorized to use.

Another system that can be used to reduce surety risks with emails is by retrieving and analyzing the IP reputation to assist with detecting bots, blocking email SPAM, preventing fake registrations, and verifying users. In some designs, the IP reputation is based on the properties of the sender's IP address, such as if it's located in a data center, originating from a hosting provider, or from a residential or wireless network. The IP address, based upon activity from the IP address, can be associated with a probability of malicious intent. Factors that can affect an IP reputation include the use of VPNs, proxies or other anonymous IP address schemes as malicious user wish to mask their identity. Stated generally, the IP reputation is an estimated behavior quality exhibited by an IP address where IP addresses frequently used by bots, scammers, hackers, spammers, cybercriminals, or other malicious users have much lower IP reputation than an address used for legitimate browsing behavior online. Internal systems and third-party services can provide IP reputational scores.

Another risk that can be associated with email communications is the ability to preform a reverse DNS lookup. Reverse DNS lookup is associated with marketing strategies as well as used to prevent malicious users such as spammers and phishing attempts. Properly used, reverse DNS lookup can validate the IP address of an incoming email against the data stored at that domain and if the email is sent from a potentially compromised service, server or deliberate spammer, the reverse DNS results may show an address that does not exist. In this case, the email can be flagged as problematic. A pointer record (PTR) is a type of DNS record that stores the domain of an IP address and maps the IP address to a hostname. Therefore, having a PTR record is beneficial so that email systems can check whether the IP address of a sending service has a matching forward and reverse DNS record.

As shown above, email protections strategies are not as simple as subscribing to a spam filter and require a layered approach, which reduces risks. Generally, the more layers, the greater the reduction in risk. Layers include the systems, techniques, frameworks, and other methods discussed above. Further, changes in the email system can result in one or more of the installed schemes being changes, outdated, improperly configured or otherwise less than optimal. Understanding what is installed, configured, and properly operating would be beneficial for the reduction in the risks associated with email communications.

Therefore, it is an object of the system to provide for a system that can identify email security risks and weakness.

It is another object of the system to provide a security score to represent the risks associated with an email system.

It is another object of the system to provide potential mitigation suggestions.

BRIEF SUMMARY OF THE INVENTION

The above objectives are accomplished by providing

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
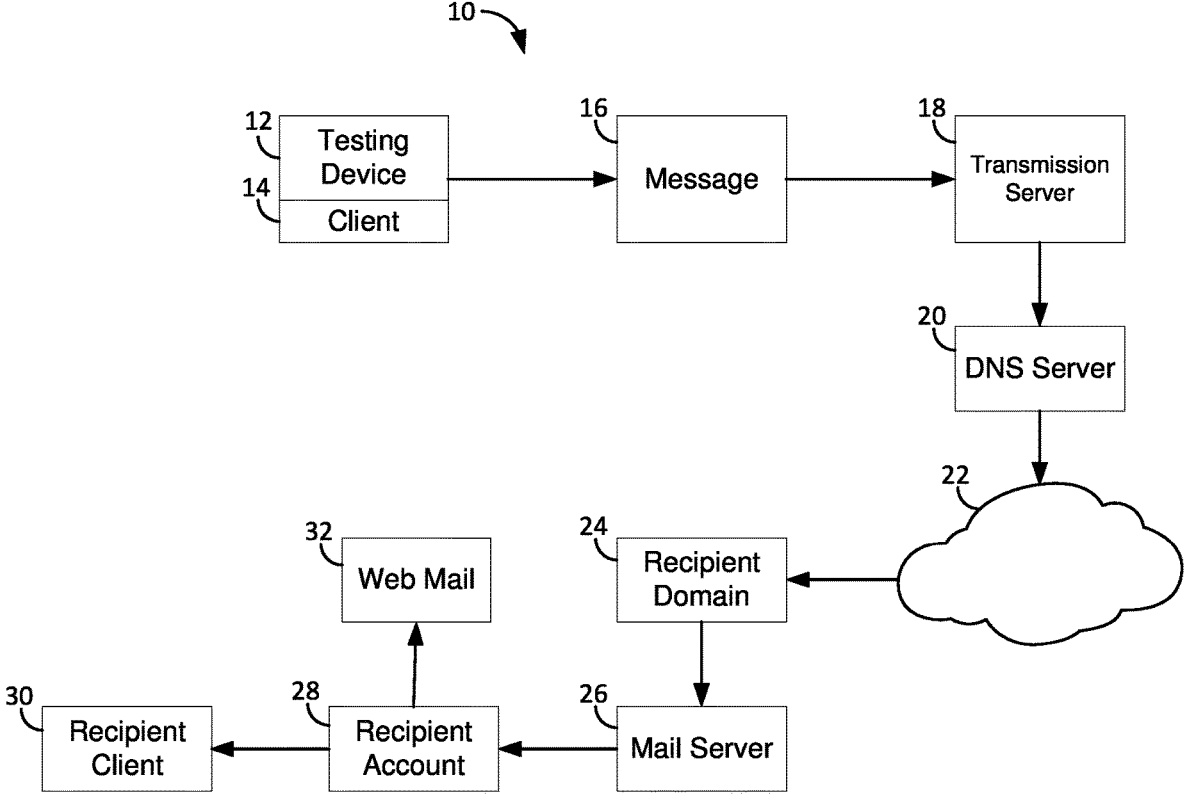
FIG. 1 is a schematic of aspects of the system.

Referring to FIG. 1, and using an email system as an example, a testing system shown generally as 10. The testing computer device 12 can be accessed directly or through SaaS (e.g., cloud based). In one embodiment, the testing system can receive an email to be testing through the SaaS configuration wherein a user enters the email on the SaaS platform. The testing system, using an email client 14 or testing device 12 can then transmit a test email 16 to a transmission server 18. The testing system composes the test email that is transmitted through a transmission server, such as an SMTP server, and then directed by a domain name system (DNS) 20. The domain name system can provide information where to send the electronic message through a global communications network 22. The electronic message is then transmitted to a domain 24 of the recipient, on to a mail server 26 and then to the recipient account 28 and recipient client 30. The test email contains the email of the recipient as that is the email to be tested. The recipient is requested to reply to the test email thereby creating and transmitted a test reply. The test reply is transmitted back to the testing system 10. In some embodiments, the recipient can access the user account receiving the test email through a browser such as webmail 32.

Figure 2:
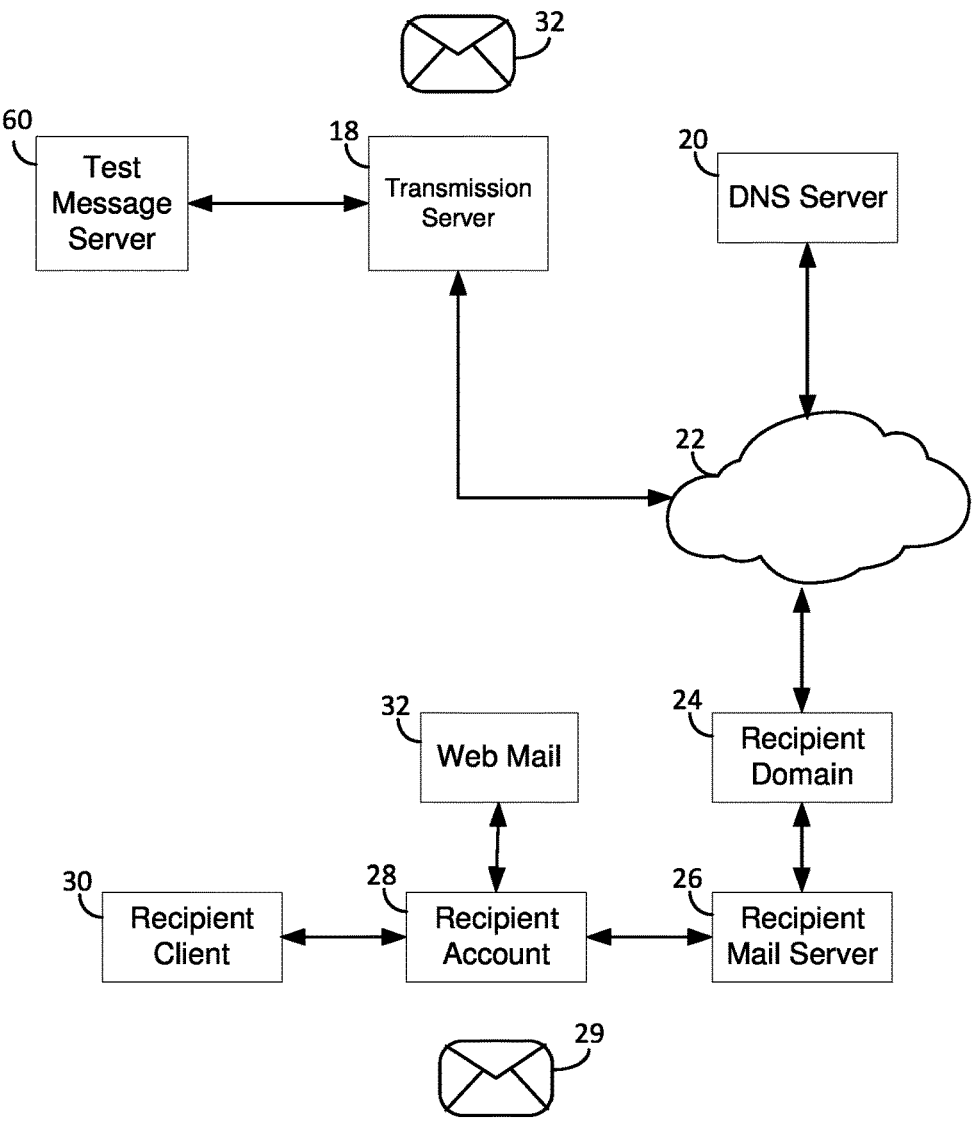
FIG. 2 is a schematic of aspects of the system.

Referring to FIG. 2, the testing system can create test email 32 that can be transmitted to the recipient's email. The test email includes the email address of the email to be tested. The test email is transmitted to the recipient's domain 24 designated for delivery to the recipient's account 28 (e.g., the recipient's email system). The recipient is then provided instructions to respond to the test email and create a test reply 29. For example, the user (e.g., recipient) can be instructed to "Simply tap 'reply' and then; send; so we can test your outbound email security and generate your full report" which such instructions can be contained in the content of the test email 32. When the user replies, a test reply 29 can be addressed to an email account associated with the testing system. The reply email can be addressed to a unique email associated with the user's request for testing.

During the process of creating the test email, transmitting the test email and receiving the test reply, the testing system can analyze components of the communications and provide information concerning the security of the email. For example, the testing system can retrieve and inspect the email header seeking information about TLS. By way of illustration, an email header can include the following:

```
Received: from CY4PR2201MB1384.namprd22.prod.outlook.com
(2603:10b6:910:6a::22) by SN4PR22MB2902.namprd22.prod.outlook.com          (1)
with HTTPS; Tue, 28 Jun 2022 14:55:33 +0000
Received: from MW2NAM04FT012.eop-
NAM04.prod.protection.outlook.com (2603:10b6:303:2a:cafe::2) by             (2)
MW3PR06CA0018.outlook.office365.com (2603:10b6:303:2a::23) with
Microsoft SMTP Server (version=TLS1_2,
cipher=TLS_ECDHE_RSA_WITH_AES_256_GCM_SHA384) id
15.20.5373.16 via Frontend Transport; Tue, 28 Jun 2022 14:55:31 +0000>
Received: from otransport-12.outbound.emailsrv.net (52.1.62.31) by
MW2NAM04FT012.mail.protection.outlook.com (10.13.31.127) with              (3)
Microsoft SMTP Server (version=TLS1_2,
cipher=TLS_ECDHE_RSA_WITH_AES_256_GCM_SHA384) id
15.20.5373.15 via Frontend Transport; Tue, 28 Jun 2022 14:55:31 +0000
Received: from NAM10-MW2-obe.outbound.protection.outlook.com (mail-
mw2nam10lp2106.outbound.protection.outlook.com [104.47.55.106]) by        (4)
ogate-3.outbound.emailservice.io (Postfix) with ESMTPS id D2D80A966C
for <doug@kimandlahey.com>; Tue, 28 Jun 2022 14:55:29 +0000 (UTC)
DKIM-Signature: v=1; a=rsa-sha256; c=relaxed/relaxed;
d=Mailprotector.onmicrosoft.com; s=selector2-Mailprotector-onmicrosoft-
com;                                                                       (7)
h=From:Date:Subject:Message-ID:Content-Type:MIME-Version:X-MS-
Exchange-SenderADCheck;
bh=CN+f5XFwlaGaTKhNrulNut5x7oE5mnx3t4xVl+4qvkQ=;
Received: from DM4PR19MB5761.namprd19.prod.outlook.com
(2603:10b6:8:60::17) by BN0PR19MB5278.namprd19.prod.outlook.com
(2603:10b6:408:151::17) with Microsoft SMTP Server (version=TLS1_2,       (8)
cipher=TLS_ECDHE_RSA_WITH_AES_256_GCM_SHA384) id
15.20.5373.18; Tue, 28 Jun 2022 14:55:26 +0000
Received: from DM4PR19MB5761.namprd19.prod.outlook.com
([fe80::d447:8c8:3b5c:1119]) by                                            (9)
DM4PR19MB5761.namprd19.prod.outlook.com
([fe80::d447:8c8:3b5c:1119%9]) with mapi id 15.20.5373.018; Tue, 28 Jun
2022 14:55:26 +0000
From: Ben Hathaway <ben.hathaway@mailprotector.com>
To: Douglas Kim <doug@kimandlahey.com>
CC: David Setzer <david.setzer@mailprotector.com>
Subject: Re: Radar Patent and Trademark(s)
Thread-Topic: Radar Patent and Trademark(s)                                (10)
Thread-Index:
AQHYiiN1/xl9gZsj6EuDAE8S5xw5nq1k0sUAgAAKU4CAAAbpglAABesA
Date: Tue, 28 Jun 2022 14:55:26 +0000
Message-ID: <4397EC37-3901-4122-AE57-
28305CF8B2F7@mailprotector.com>
In-Reply-To:
<SN4PR22MB2902782099AD395EA9F4382ED1B89@SN4PR22MB2902
.namprd22.prod.outlook.com>
Accept-Language: en-US                                                     (11)
Content-Language: en-US
X-MS-Has-Attach:
X-MS-TNEF-Correlator:
Authentication-Results-Original:
```

-continued

```
dkim=none (message not signed)
header.d=none;
dmarc=none action=none
header.from=mailprotector.com;
spf=none;
X-Microsoft-Antispam-Message-Info-Original:
zzKZNSEnd7Z8oihwEWwkiQF6Pvi6TIllobQXfo7PWxoDRY9M29iCAY3Yr
P9cnFYiGy0Uf0DB7HPRnb0pAMo8kEIVS7yw1YNCJY9KfDuMkpcD5u8T
z/gvvN+fXS/liXZZFGMQQ9w/GCm4PZBsEQJ7vF2h7wWaMVWdK9BzkW
5uJMxBqFyRsKeHMDOJmq+HdCAfUcQH0qJegXbkoXBFiVqlCIL787luOh
6LGcx3N28FaW/WycZlpTKTq54CQjUU99JaMPpdVWfxh7Qz4Zv35CQ3P
qwgODUGasTYdM9BYxULY1aPyYBtvTKyrkJqOrX/6EIEAndqS5MvDKDP
5xBT26zl3vy+E+s87XLW5/VZNUilgclqLKQAOYuDYPugHVZG4ENwy97it
1eEb4Jblz4eu0HXtCRtl9uv40mr3/m/YV8iexZtnP21bNUG85n82JVrbBwz7
W6kS/g3FVzOSlrFncs1ARF8trPLOiLxIBUQ4NNzSWohQhwRg8cm2fPOrz
iSv58l/TtA3NWdJ+trW8BDJjfuHDzWY/bL4vmZhU9h7uNw7fAsmW+sdtniE
yaKeenYPrOdwBShlbfqQ42vHNag+EH/xLjUCBDcZjUlCeLelitPBHffoDtca
GtlVBE2zqkXWvYBJ5tXUrpZ3vG7PdE8ejtv41yNku1Oc2NrvZlFt2J2/w5Ub
t80msrQ4VB1X1IPrYFAGjZW8incjFwCXEMjg4oC5+UioHpWhk+dq9/v0B
MgSZhdmknhcVAGW4fxLkd2/ufjMYsc07/P+B9qrmT6fuNlv2mkL4KROvs0
IQwAoq38dyvbmreofMFbrwVizdWArpDGaNnrxqlpllhcLSzpOxA4Qiin/AT/r
wjFGl+y1t9XlMe68iAAqORjrw9zbMG03+PBWJ9fFwZdNpZeWeeB+73uH
dRA8hm1uhiezKsM4PVOUsU=
```

(12)

From an analysis of the information for this email header, it can be seen that this test email went through several servers, each with certain information. Reviewing each of the "Received" header information, we can see that TLS encryption was used by each server. Therefore, the testing system can determine if TLS is used among the test email path and increase a security score when TLS is present at each stage and reduce a security score when TLS is missing from one or more servers in the transmission path from the testing system to the recipient and back.

The system can also use the test message and the reply message to attempt establish a TLS connection. In establishing these connections, the testing system can analyze the connection, determine if it is a secure connection and can review the certificate for validity and expiration. If the TLS certificate is missing or expired, the system can provide a notification and can lower the score. This analysis can also apply to message system access using https and determine if the certificate associated with the https is present and valid.

Further, each "Received" header includes a date and time timestamp so that the delay created by the transmission services (e.g., servers) can be calculated. The delay can be used to determine the performance of the message system. In one embodiment, performance information can be provided to the user inquiring about the message domain. The testing system can also determine if the "From address" has been blacklisted and increase security score in the event that one or more of the domains in the travel path of the email are blacklisted. From the header information, the testing system can determine if the DKIM record is aligned or not aligned. In this process, the testing system can determine if the message are properly cryptographically signed and therefore can provide for authentication of a message. When the DKIM record is missing, the score can be lowered.

The testing system can also review the MX record associated with the email address to be tested and determine if the MC record exposes the email hosting system. In some configurations, especially those that are less secure, the MX record points to the email service or service used by the email address being tested. This exposes the email server increasing the risks that someone with malicious intent sends an email message that appears to originate from a seemingly trusted email domain, as the malicious user gains information about the email domain from the MX record. In the event that the MX record exposes directly the email domain, the security score can be lower.

The testing system can review the SPF record and determine if the SPF record is present and properly configured. In the example above, there is no SPF record and therefore the security score can be lowered. The SPF record can also be reviewed to determine if there are third party domain that can send emails on behalf of the organization associated with the email being tested.

The testing system can review the DMARC DNS record and determine if the DMARC record is present and properly configured. In the example above, there is no DMARC record and therefore the security score can be lowered. The missing DMARC record prevents the ability to see threats targeting the organization associated with the email being tested.

The testing system can review the IP associated with the test email and reply email and retrieve an IP reputation from an internal source associated with the testing system or from a third-party provider. A negative reputation can result in a lower security score.

The testing system can also preform a reverse DNS lookup using the IP address associated with the test email. The IP address is used to determine the hostname associated with the test email. If there is no pointer record (PTR) then reverse DNS lookup cannot provide the hostname and the security score may be lower.

The testing system can also use tracking in the test email to determine characteristics associated with the test email and the reply email, for example, if an email has been opened, when, the location and the type of device that was used to read the email. The test email can include a tracking pixel or other tracking item that can be included in the email. The testing email, when opened, can inform the testing system that the tracking item was allowed and therefore the security score lowered. The test email system inability to filter or stop tracking pixels increases the security risks associated with the test email.

In one embodiment, the security score begins with a initial security score and then when each analyzed item is not represent or fails to provide proper security, deduction are made to the security score. For example, Table 1 illustrates potential deductions:

TABLE 1

| Analyzed Item | | Deduction (points) |
|---|---|---|
| Received Email With (TLS) Encryption | No | −150 |
| Transmits Email With (TLS) Encryption | No | −150 |
| MX Record Exposes Email Host | Yes | −100 |
| DomainKeys Identified Mail (DKIM) used | No | −100 |
| Sender Policy Framework used | No | −100 |
| Domain/IP Reputation | Negative | −100 |
| Domain-based Message Authentication Reporting and Conformance (DMARC) used | No | −75 |
| Reverse DNS IP matches hostname | No | −50 |
| Spyware allowed | Yes | −25 |

Figure 3:
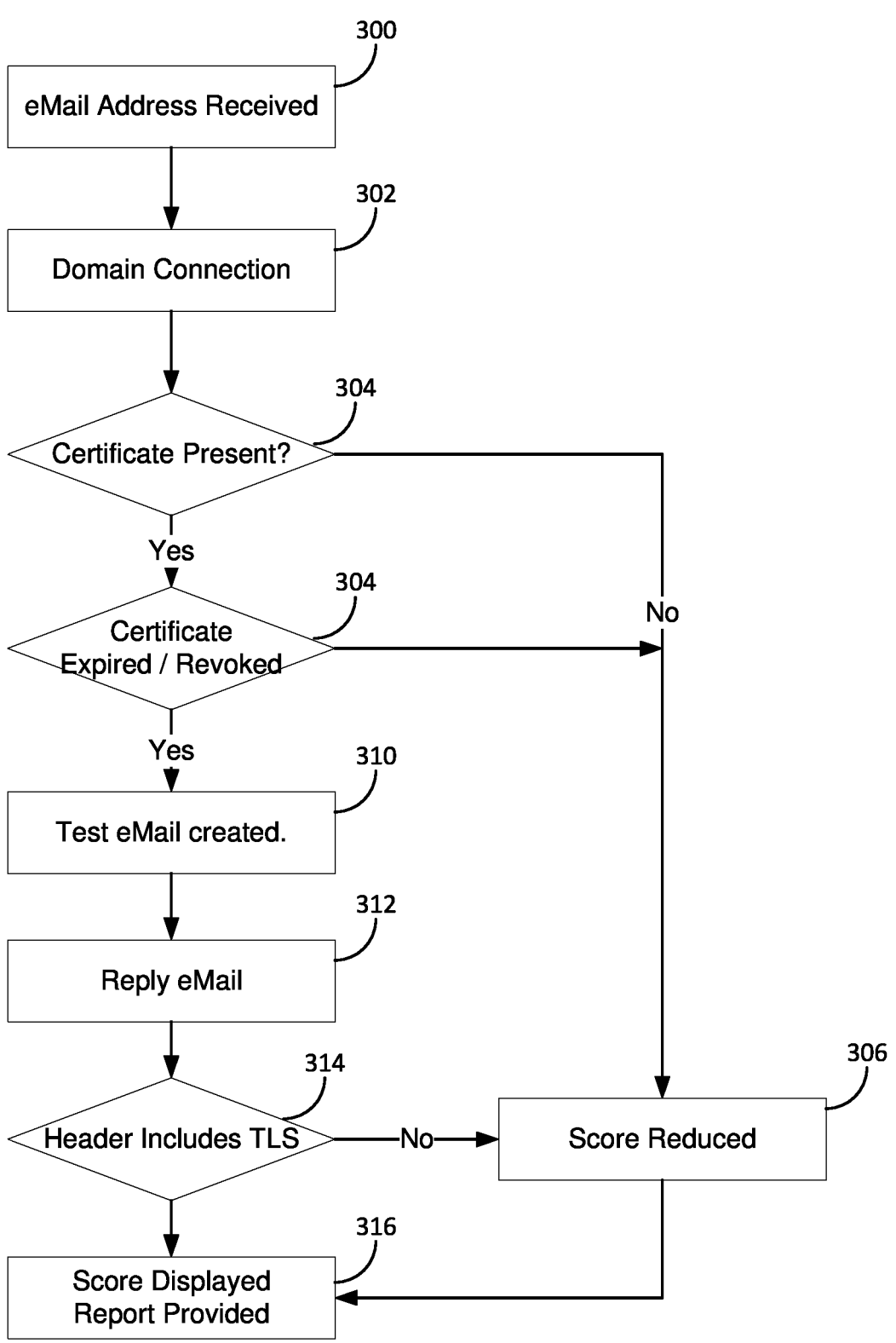
FIG. 3 is a flowchart of aspects of the system.

Referring to FIG. 3, the computer readable instructions for illustrating the analysis for TLS encryption for the test email is shown. An email is entered to be tested at 300. A connection to the email domain is attempted at 302. The presence of the TLS certificate can be made at 304 and if the TLS certificate is not present, the score can be reduced at 306. The validity of the certificate can be determined at 308 which can include verification of the digital signature associated with the domain, analysis of the certification chain, including intermediate certificates, review of the expiration or activation dates of the TLS certificate, the revocation status of the certificate and any combination thereof. If the certificate is invalid, the score can be lowered at 306. A test email can be created using the address provided at 310. The test email can be sent to the address provided and a reply email can be returned to the testing system at 312. The test email and the reply email can be analyzed for the TLS information at 314 and if the header information does not include TLS information, the score can be lowered at 306. The score can be provided, or a report can be provided at 316.

The header information can also be used to determent the time that the message is generated, sent, received as well as when a reply is generated, sent and received. The time between these events can be used to determine or analyze the performance of the message system with the longer the time between these events, the less efficient the messages system.

Figure 4:
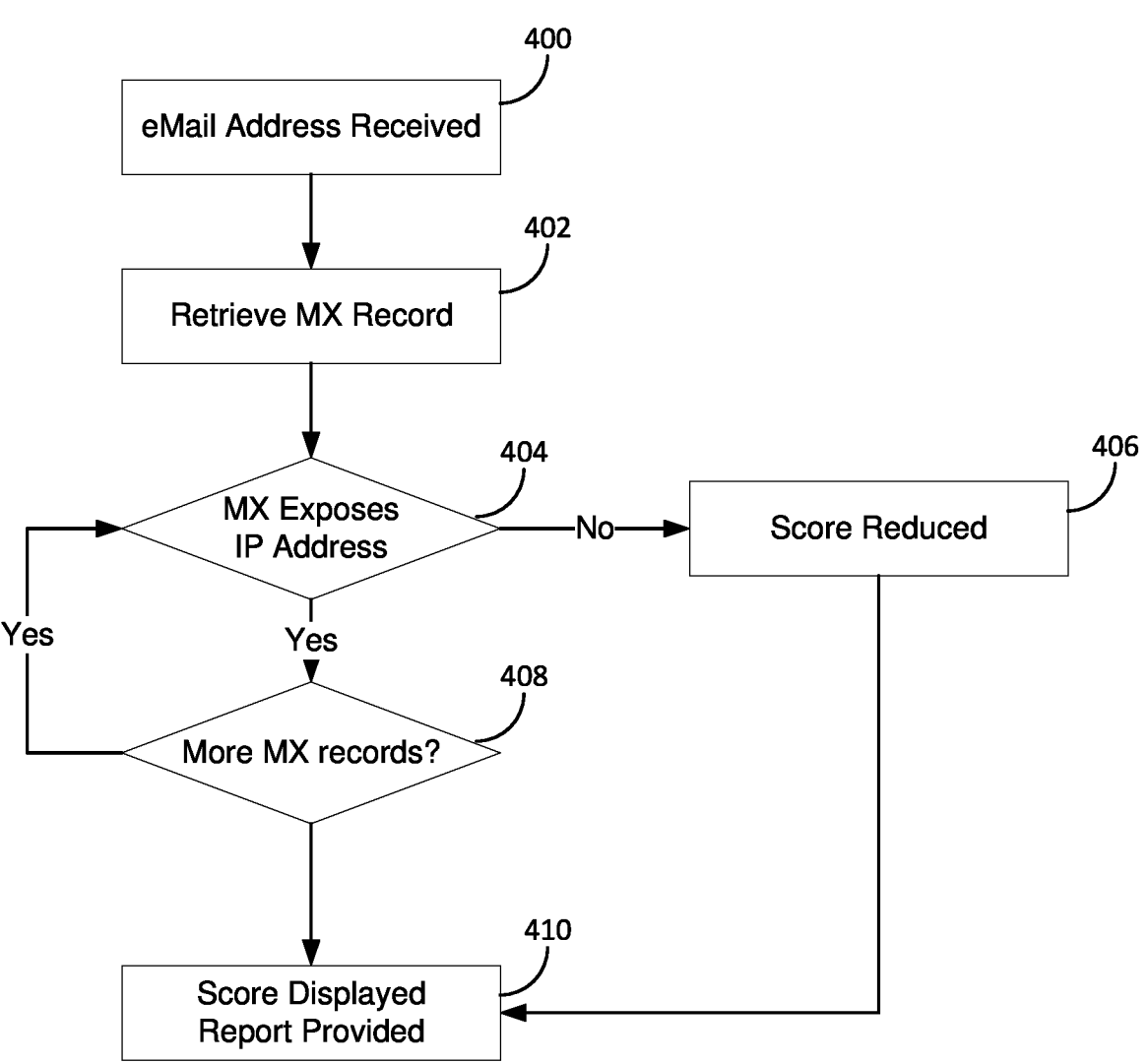
FIG. 4 is a flowchart of aspects of the system.

Referring to FIG. 4, the computer readable instructions for illustrating the information revealed by the MX record is shown. An email is entered to be tested at 400. The domain name is used to retrieve the MX record(s) associated with the domain name at 402. A determination is made if the MX record which, based upon its configuration, exposes the sender's origin IP address at 404 and if so, the score can be lowered at 406. A determination is made if there is another MX record, and that MX record can be analyzed at 404. The score can be displayed, or a report generated at 410.

Figure 5:
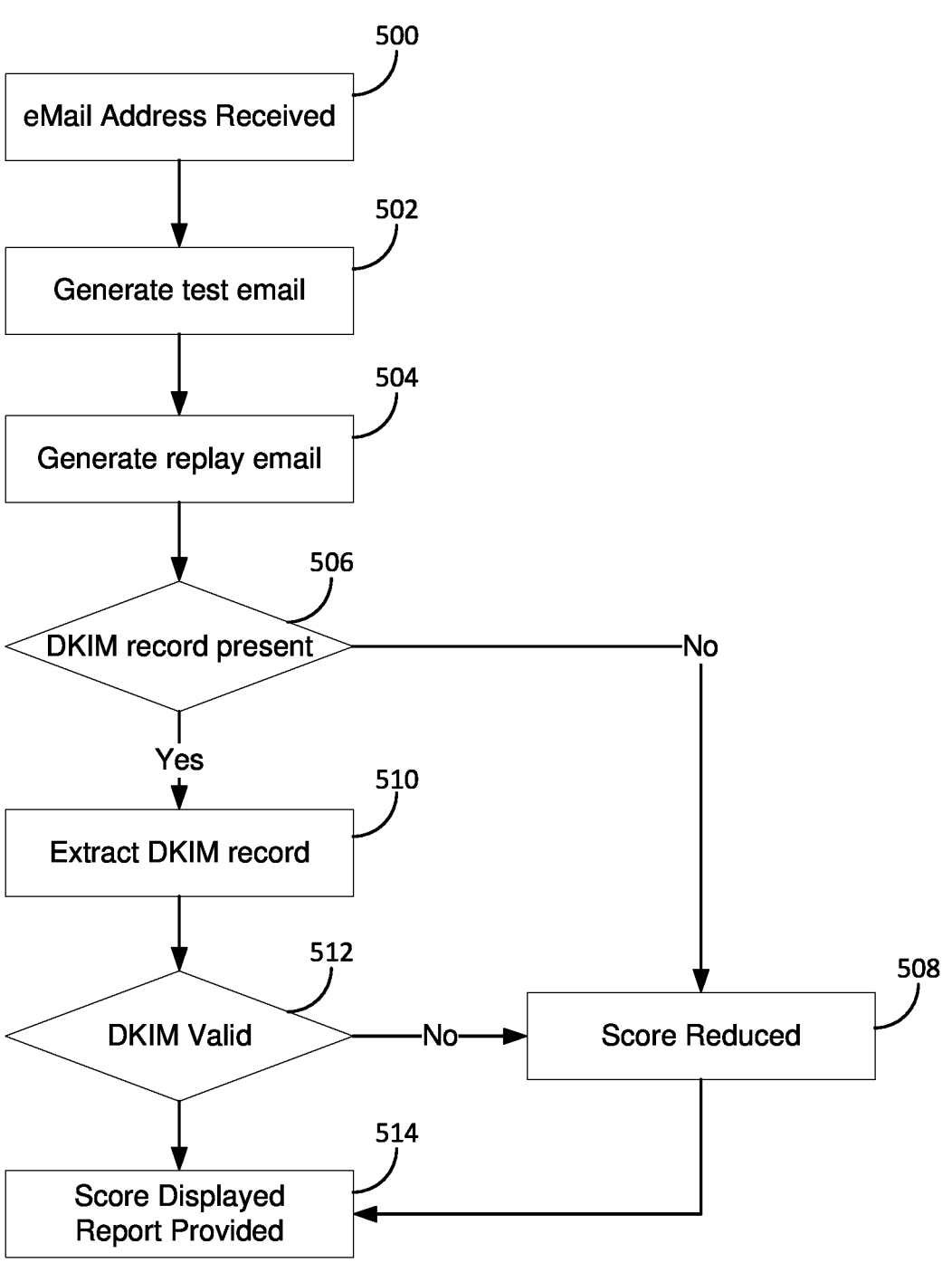
FIG. 5 is a flowchart of aspects of the system.

Referring to FIG. 5, the computer readable instructions for illustrating the information revealed by the DKIM record is shown. An email is entered to be tested at 500. A test email addressed to the email provided is generated at 502. The email is sent, and a reply email is requested. The email system to be testing (e.g., the message system that manages the domain in the test email), generates a reply email at 504. The testing system receives the reply email and determines if there is a DKIM signature from the email header and if not, the score can be lowered at 506. If present, the DKIM record can be extracted from the header at 410 and validated using a public key at 512. If the DKIM signature is not valid, the score can be lowered. The score can be displayed, or a report generated at 514.

Figure 6:
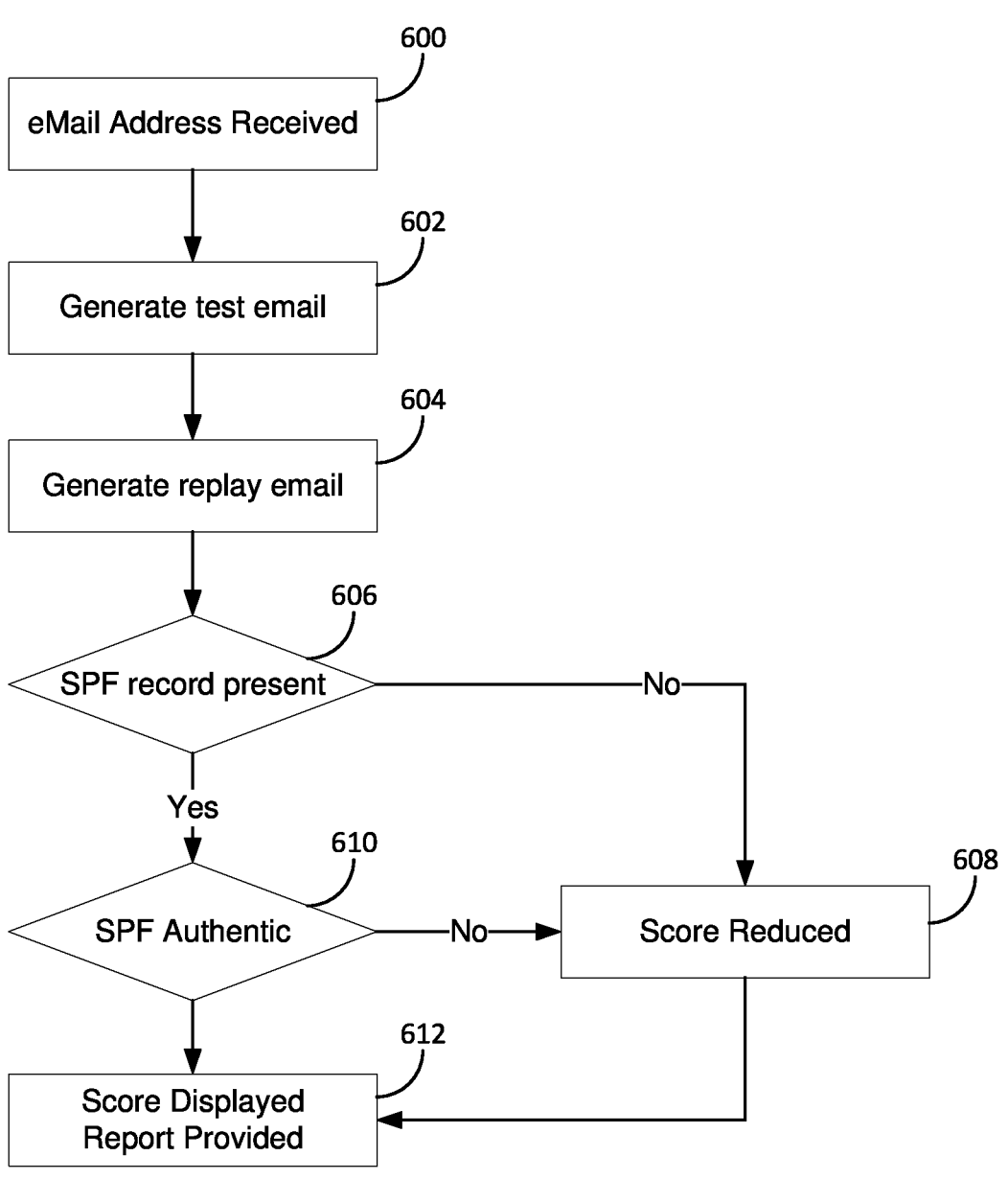
FIG. 6 is a flowchart of aspects of the system.

Referring to FIG. 6, the computer readable instructions for illustrating the information revealed by the SPF record is shown. An email is entered to be tested at 600. A test email addressed to the email provided is generated at 602. The email is sent, and a reply email is requested. The email system to be testing (e.g., the message system that manages the domain in the test email), generates a reply email at 604. The testing system receives the reply email and determines if there is a SPF record that can be subject to look up at 606 from the email header and if not, the score can be lowered at 608. If present, the SPF record can be authenticated at 610. If the SPF record is not authenticated (e.g., invalid address), the score can be lowered. The score can be displayed, or a report generated at 612.

Figure 7:
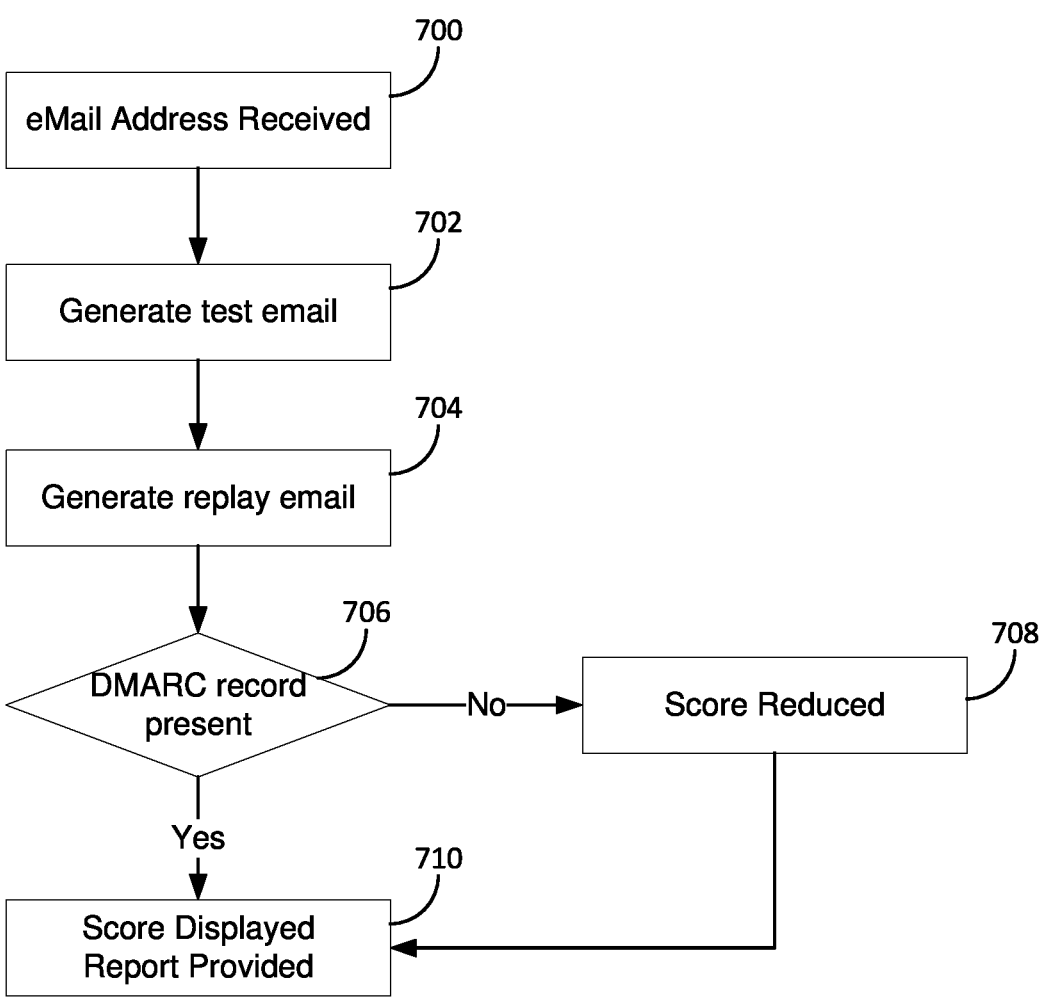
FIG. 7 is a flowchart of aspects of the system.

Referring to FIG. 7, the computer readable instructions for illustrating the information revealed by the DMARC record is shown. An email is entered to be tested at 700. A test email addressed to the email provided is generated at 702. The email is sent, and a reply email is requested and generated at 704 which can be received by the testing system. The testing system determine if there is a DMARC record associated with the domain at 706 (e.g., DNS server for the domain) and if not, the score can be lowered at 708. The score can be displayed, or a report generated at 710.

Figure 8:
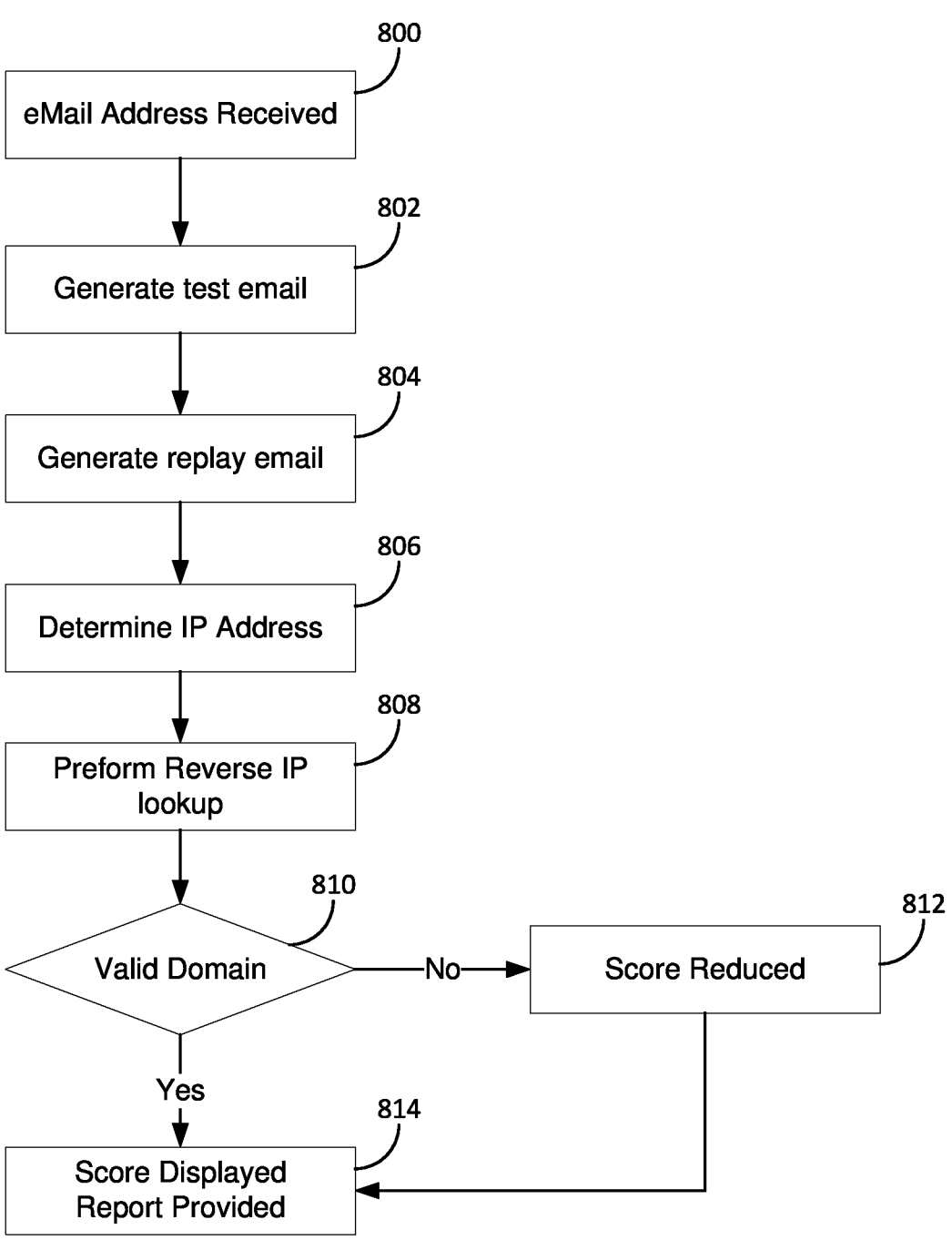
FIG. 8 is a flowchart of aspects of the system.

Referring to FIG. 8, the computer readable instructions for illustrating the information revealed by the reverse DNS lookup is shown. An email is entered to be tested at 800. A test email addressed to the email provided is generated at 802. The email is sent, and a reply email is requested and generated at 804 which can be received by the testing system. The IP address associated with the test email domain of the reply email, such as in the reply email header or domain, can be determined at 806. The IP address can then be associated with a domain at 808. If the domain is not a valid domain at 810 the score can be lowered at 812. The score can be displayed, or a report generated at 814. The score can also be lowered when the pointer record of the message system to be tested has a matching forward and reverse DNS record.

Figure 9:
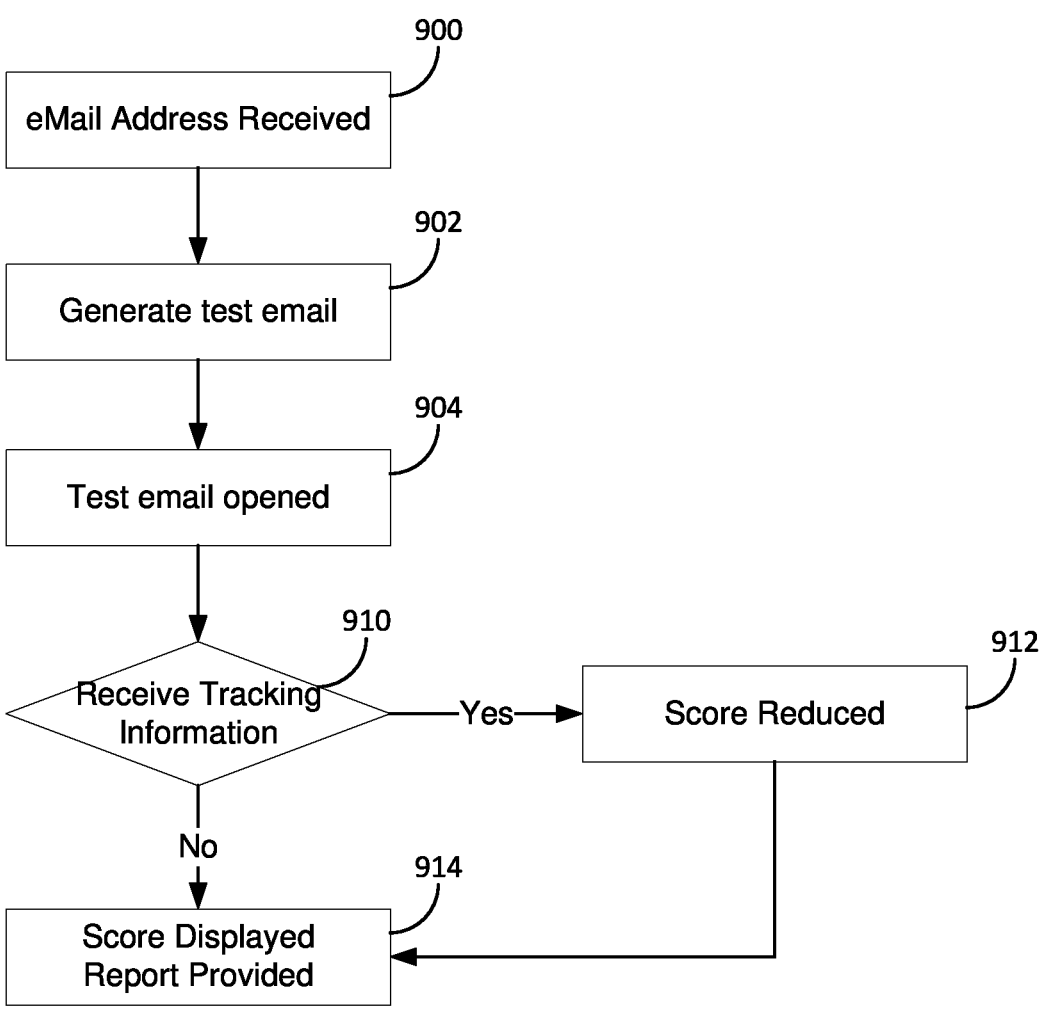
FIG. 9 is a flowchart of aspects of the system.

Referring to FIG. 9, the computer readable instructions for illustrating the information revealed by the email tracking information is shown. An email is entered to be tested at 900. A test email addressed to the email provided is generated at 902 and can include a tracker, such as a tracking pixel. The tracking pixel or image can be added to the test email that is sent to the message system to be tested. The target message system can open the test email at 904 and the tracking pixel can load and send a request to an automated email system at 910 that can allow the activity of the test email to be seen, such as opening the test message. If the testing system receives information form the tracking pixel, the target message system score can be lowered at 912. The score can be displayed, or a report generated at 914.

The system described herein is directed to a series of acts that can protect a computer or computer system from electronic communication that may contain malicious code of other undesirable content. The computerized system is one that is at least directed to a process. The system can identify and potentially isolate electronic messages in an electronic message system according to the edge value and/or the confidence values. The edge value and confidence values associated with a sender or electronic message can be stored in a database that can be accessible by a second analytical computer system that does not have to be in direct communications with the first analytical computer system. The processes and procedures that are described herein can be actuated by a compute processor that executes computer readable instructions to provide the functionality herein.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A computerized system for analysis of electronic communication systems comprising:

a computerized testing system; and, a set of testing computer readable instructions included in the computerized testing system adapted for:

receiving an email address representing a target message system to be tested, generating a test email addressed to the target message system wherein the test message requests a reply message, generating a test message according to the test email address, sending the test message to the target message system with a reply instructions providing instructions to the recipient on how to reply, receiving a reply from the target message system according to the reply instructions, analyzing the test message and the reply message according to a security test taken from the group consisting of: a TLS encryption analysis, a MX record exposure, a DKIM presence, a SPF presence, a DMARC presence, a reputational information, a reverse DNS lookup consistency and any combination thereof thereby providing a set of security score deduction factors, generating an aggregate deduction value according to the set of security score deduction factors, generating a security score according to subtracting the aggregate deduction value from a base value, displaying the security score, and, displaying recommendations for target message system modifications according to the security score deduction factor.

2. A computerized system of claim 1 wherein the set of testing computer readable instructions area adapted for determining whether a DMARC record is present and increasing the security score deduction factor if the DMARC record is not present.

3. A computerized system of claim 1 wherein the set of testing computer readable instructions area adapted for requesting a reputational information from an email service provider and increasing the security score deduction according to the reputational information.

4. A computerized system of claim 3 wherein the security score deduction is increased by a difference between one hundred and a reputational score.

5. A computerized system of claim 3 wherein the reputational information is associated with a target message system domain.

6. A computerized system of claim 3 wherein the reputational information is associated with a target message IP address.

7. A computerized system of claim 3 wherein the reputational information is created according to reputational factors taken from the group consisting of spam placement rate, read rate, deleted before reading rate, open rate, click rate, reply rate, forward rate, complaint rate, non-spam rate, hard bounces, spam traps and any combination thereof.

8. A computerized system for analysis of electronic communication systems comprising:

a computerized testing system;

a set of testing computer readable instructions included in the computerized testing system adapted for:

generating a test message having a created test email address, sending the test message to a target message system with a reply instructions, receiving a reply message from a target message system addressed to the computerized testing system according to the test message and the reply instructions, calculating a security score according to a security test taken from the group consisting of: a TLS encryption analysis, a MX record exposure, a DKIM presence, a SPF presence, a DMARC presence, a reputational information, a reverse DNS lookup consistency and any combination thereof, and, displaying the security score.

9. A computerized system of claim 8 wherein the set of testing computer readable instructions are adapted for displaying a recommendation associated with the target message system according to the security score.

10. The computerized system of claim 8 wherein security score is a first security score, and the set of testing computer readable instructions are adapted for calculating a second security score and providing an aggregate security score according to the first security score and the second security score.

11. The computerized system of claim 8 wherein the set of testing computer readable instructions are adapted for calculating the security score according to a geographic location associated with the target messaging system IP address.

12. The computerized system of claim 8 wherein the set of testing computer readable instructions are adapted for calculating the security score according to a testing frequency associated with the target messaging system.

13. The computerized system of claim 8 wherein the set of testing computer readable instructions are adapted for calculating the security score according to a determination of the presence of a tracking item.

14. A computerized system for analysis of electronic communication systems comprising:

a computerized testing system; and, a set of testing computer readable instructions included in the computerized testing system adapted for:

receiving a reply message according to a test message created by the computerized testing system and sent to a target message system wherein the reply is created according to reply instructions accompanying the test message and the reply message is addressed to the computerized testing system, and, calculating a security score according to a security test taken from the group consisting of: a TLS encryption analysis, a MX record exposure, a DKIM presence, a SPF presence, a DMARC presence, a reputational information, a reverse DNS lookup consistency, tracking item, and any combination thereof.

15. The computerized system of claim 14 wherein the set of testing computer readable instructions are adapted for transmitting the security score to an email address associated with the test message.

16. The computerized system of claim 14 wherein the set of testing computer readable instructions are adapted for retrieving a recommendation according to the security score and displaying the recommendation.

\*    \*    \*    \*    \*